United States Patent [19]

Oprescu et al.

[11] Patent Number: 5,357,630

[45] Date of Patent: Oct. 18, 1994

[54] NAME RESOLUTION METHOD FOR A DISTRIBUTED DATA BASE MANAGEMENT SYSTEM

[75] Inventors: Valentin Oprescu, Evanston; Manoj Dalmia, Carol Stream, both of Ill.

[73] Assignee: Motorola, Inc., Schaumburg, Ill.

[21] Appl. No.: 780,182

[22] Filed: Oct. 21, 1991

[51] Int. Cl.$^5$ .............................................. G06F 15/21
[52] U.S. Cl. ............................... 395/600; 364/DIG. 1; 364/282.4; 364/284.4; 364/242.95
[58] Field of Search ................... 395/600; 364/DIG. 1

[56] References Cited

U.S. PATENT DOCUMENTS

| | | | |
|---|---|---|---|
| 4,432,057 | 2/1984 | Daniell et al. | 364/DIG. 1 |
| 4,635,189 | 1/1987 | Kendall | 364/DIG. 1 |
| 4,694,396 | 9/1987 | Weisshaar et al. | 364/DIG. 1 |
| 4,769,772 | 9/1988 | Dwyer | 364/DIG. 1 |
| 4,835,685 | 5/1989 | Kun | 364/DIG. 1 |
| 4,914,571 | 4/1990 | Baratz et al. | 364/DIG. 1 |

FOREIGN PATENT DOCUMENTS

0362971  2/1985  European Pat. Off. .

Primary Examiner—Thomas M. Heckler
Attorney, Agent, or Firm—Walter N. Nielsen; S. Kevin Pickens

[57] ABSTRACT

At start-up, input/output bus is scanned to detect any unprocessed I/O devices and each device is scanned to locate any unprocessed data base partitions. If any are located, these partitions are stored in memory and the partitions are marked as processed. During run-time, a message is received indicating that a new I/O device has come on-line. The new I/O device is scanned for any unprocessed partitions. The information regarding the partitions is stored in memory and the partition is marked as processed. The process also functions during data base operations to make connections between a client and a data base. A sequential process routes a connection request message through one node at a time around the network until all of the tables requested have been connected. If the message is returned to the originating node with out being completed, a failure is reported to the client. A parallel process broadcasts the connection request message to all of the nodes on the network simultaneously. Each node will then make local connections with any requested tables residing on that node and reply to the originating node. Once all of the replies are received, the originating node will collate the replies and assign tables to the client. In the event of duplicate table names, the rejected ones will be issued a disconnect.

12 Claims, 8 Drawing Sheets

NAME RESOLUTION METHOD FOR A DISTRIBUTED DATA BASE MANAGEMENT SYSTEM

RELATED INVENTIONS

The present invention is related to the following inventions, all assigned to the assignee of the present invention:

Computer System with Data Residence Transparency and Data Access Transparency, invented by Andrew Kun, Frank Kolnick, and Bruce Mansfield, having Ser. No. 07/300,687 (now U.S. Pat. No. 5,014,192) filed on Jan. 19, 1989, which is a continuation of Ser. No. 07/110,614 (now abandoned), which was a continuation of Ser. No. 730,929 (now abandoned);

Method of Inter-Process Communication in a Distributed Data Processing System, invented by Bernhard Weisshaar, Andrew Kun, Frank Kolnick, and Bruce Mansfield, having U.S. Pat. No. 4,694,396, and issued on Sep. 15, 1987;

Single Virtual Machine with Message-Like Hardware Interrupts and Processor Exceptions, invented by Andrew Kun, Frank Kolnick, and Bruce Mansfield, having U.S. Pat. No. 4,835,685, issued on May 30, 1989;

Process Traps in a Distributed Message-Based Operating System, invented by Gabor Simor, having Ser. No. 07/476,115, (now abandoned) filed on Jan. 29, 1990, a continuation of Ser. No. 07/336,630 (now abandoned), which was a continuation of Ser. No. 07/000,624 (now abandoned);

Distributed Computer System with Network and Resource Status Management, invented by Leslie G. Seymour, having Ser. No. 294,037, (now U.S. Pat. No. 5,109,486) and filed on Jan. 6, 1989;

Distributed Computer System with Process Status Monitoring, invented by Leslie G. Seymour, having Ser. No. 318,101 (now abandoned), and filed on Mar. 2, 1989; and Method for Monitoring Data Objects in a Data Base, having Ser. No. 07/346,043 (now abandoned), and filed on May 2, 1989.

Microfiche Appendixes

The present disclosure contains microfiche Appendixes consisting of two microfiche containing 172 frames.

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

FIELD OF THE INVENTION

The present invention relates, in general, to data bases and data base management systems (DBMS) and, more particularly, to a name resolution method for a distributed data base management system.

BACKGROUND OF THE INVENTION

A data base management system is a software application whose function is to interface between a data base and any applications/processes requesting access to the data base. In general, a data base management system provides for the organization of, access to, and control of one or more data bases.

A data base is a collection of logically organized data items. A data base is organized into uniquely named entities called tables, each table having one or more records contained therein. Each record, in turn, is divided into a number of fields. The table may be referred to as a view. The rows of a view are related to the records of the table. The columns of a view are related to the fields of the records. These terms will be used interchangeably herein.

The present invention, while applicable to any data base environment, has been implemented in a distributed data processing system consisting of two or more data processing systems which are capable of functioning independently but which are so coupled as to send and receive messages to and from each other.

A local area network (LAN) is an example of a distributed data processing system. A typical LAN comprises a number of autonomous data processing "nodes", each comprising at least a processor and memory. Each node is capable of conducting data processing operations independently. In addition, each node is coupled to a network of other nodes.

A "process", as used herein, is a self-contained package of data and executable procedures which operate on that data, comparable to a "task" in other known systems. Within the present invention a process can be thought of as comparable to a set (module) of subroutines in terms of size, complexity, and the way it is used. The difference between processes and subroutines is that processes can be created and terminated dynamically and can execute concurrently with their creator and other sets (modules) of "subroutines".

Every process in the distributed data processing system of the present invention has a unique identifier connector by which it can be referenced. The connector is assigned by the system when the process is created. The connector is used by the system to physically locate the process, as well as address it directly.

Every process also has a non-unique, symbolic "name", which is a variable-length string of characters. In general, the name of a process is known system-wide.

The operating system described in the patents and patent applications of the Related Inventions section above provides for transparent inter-process communication across the LAN; and various services that allow any process to require asynchronous notification of various events.

In a distributed data base system, portions of the same data base are residing at different nodes of the system. For example, in a manufacturing environment, each machine on an assembly line can be equipped with independent processing which locally maintains a record of the parts processed. Each record from the various machines is used to form a single data base for the parts processed.

One problem in this type of distributed system is the naming and location of the individual portions of the data base. Since the portions are not always in contact with each other or a central management process, it is possible that redundant names may be generated. Therefore, there is a need in the industry to provide a data base management system that will resolve any name discrepancies and locate the resources.

Because of the distributed configuration of the data base, there is also a need in the industry for a system which can be continuously maintained. This will permit devices containing portions of the data base to be removed from or added to the system without disturbing the functioning of the data base.

In addition, there is a need in the industry that any changes in any of the portions of the data base be immediately registered with the data base management system so those changes become visible network wide for all the applications using the data base management system.

SUMMARY OF THE INVENTION

A method for providing automatic name resolution without an existing and static list of resource names or other topographic information in a distributed data base management system is described which operates at start-up, run-time, and for certain data base operations. During start-up, the present invention operates to scan the input/output bus to detect any "not yet inspected" or "unprocessed" I/O devices. Each "unprocessed" I/O device is then scanned to locate any "unprocessed" data base partitions. If any are located, the database information associated with each partition is stored in memory and the partitions are marked as "processed". In the event that the name of an "unprocessed" partition is already in use (i.e. a duplicate exists), a notification of this condition is provided. Once all partitions have been inspected the device that holds them is marked as "processed".

During run-time, a message is received from the operating system when a new I/O device comes on-line. The name resolution method will scan the new I/O device for any "unprocessed" partitions. The information regarding any those partitions is stored in memory and the partitions are marked as "processed". In the event that the name of an "unprocessed" partition is already in use, a notification of this condition is provided and the associated information is ignored. Conversely, when an I/O device goes off-line, a message from the operating system is received which causes all the information regarding the databases which were residing on partitions of that device to be discarded.

During data base operations, the name resolution process is used to make the connection between the data base and the client making the request. This process may be conducted sequentially or in parallel. The sequential process forwards a connection request message around the network one node at a time in a predetermined order until all of the data base connection requests have been satisfied. A message is then returned to the client informing the client as to where the data base tables are located. If the message travels through the full network and is returned to the originating node without being completely satisfied, then the client is notified of the partial failure. In the parallel process, the connection request message is broadcast immediately to all of the nodes on the network. The individual nodes perform the work simultaneously and then inform the originating node as to which data base requests they can satisfy. Once all of the replies are received, the originating node collates the replies and determines (arbitrates) which data base tables will be selected from each node. If duplicate data base tables are found, the connections to the rejected tables will be rolled back (severed). In either method, nodes that come on line during the process itself start participating immediately.

DETAILED DESCRIPTION OF THE DRAWINGS

Figure 1:
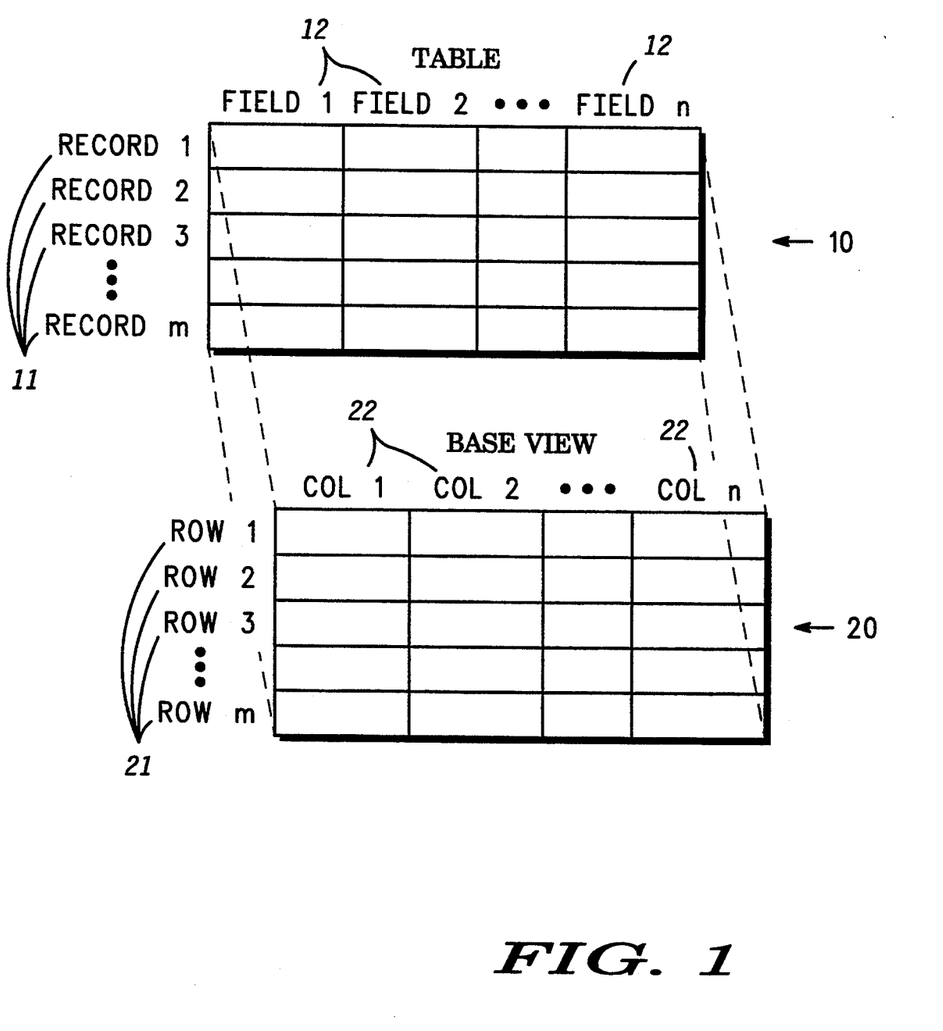
FIG. 1 shows a visual representation of a data base table in block form.

Referring initially to FIG. 1, a visual representation of a data base table, generally designated 10 is illustrated. As shown, table 10 is visually represented by a base view generally designated 20. Table 10 consists of records 11 being divided into fields 12. In base view 20, rows 21 and columns 22 correspond to records 11 and fields 12, respectively.

In the following description, reference shall be made to the accompanying computer code provided in the microfiche Appendixes. The reference shall appear as—(A:166–331)—meaning that the computer code corresponding to this portion of the process can be found in Appendix A, lines 166–331.

Figure 2:
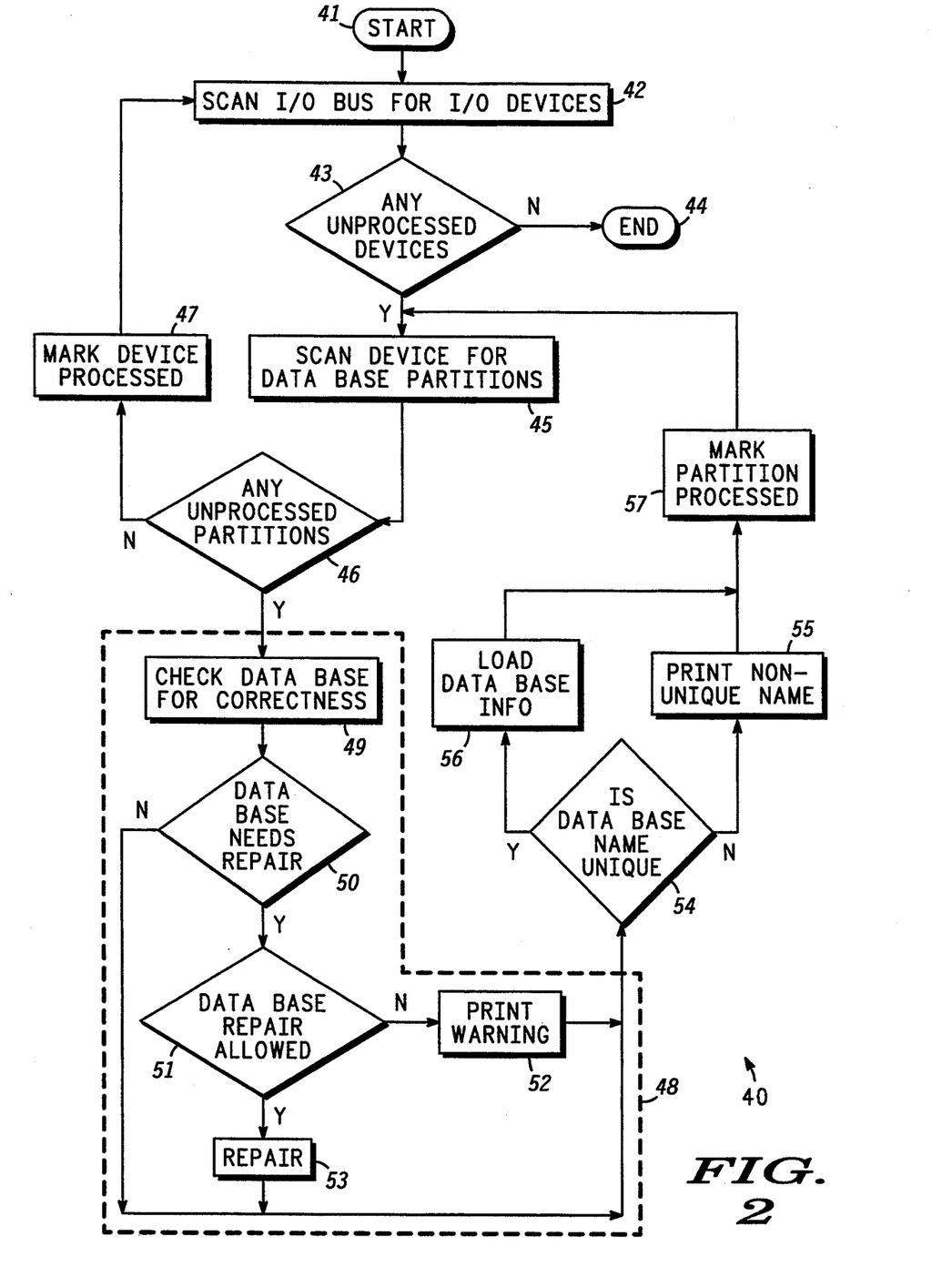
FIG. 2 shows a flow chart of a method, utilizing the present invention, for building the name space in a distributed data base system during system start-up.

Referring now to FIG. 2, a flow chart illustrating a process, utilizing the present invention and generally designated 40, of resolving names in a distributed data base system during start-up is shown. This process is utilized during start-up to build the name space of the resources (e.g. tables) to be managed by the DBMS.

Process 40 starts at step 41 and moves to step 42 where the input/output (I/O) bus of each node of the distributed information system is scanned for I/O devices (J:166–331). The process then continues to decision step 43 (J:168–190) where it determines if any "unprocessed" I/O devices exist. If there are no "unprocessed" I/O devices left, process 40 ends, step 44 (J:189).

If there are any "unprocessed" I/O devices, they are scanned for any data base partitions (K:131–193). Process 40 then determines if there are any "unprocessed" partitions found, decision step 46 (K:170–171). If there are no "unprocessed" partitions, the I/O device is marked as "processed" step 47 (J:327) and the process loops back to step 42.

Next, process 40 enters a subroutine 48 (B:261–269) which invokes a tool to check and regain any damaged data bases. Subprocess 48 starts with a check of the data base, step 49 (B:268). The process then moves to decision step 50 where it is determined if any repairs are needed. If repairs are needed, subprocess 48 then determines if repairs are permitted, decision step 51. If repairs are not permitted, the process prints a warning that the "DB Needs Repair", step 52. If repair is permitted, the partition is repaired, step 53 (B:266).

If the partition did not need to be repaired (step 50); following warning step 52; or following repair step 53, subprocess 48 exits. Process 40 then determines if the data base name of the partition is unique, decision step 54 (C:311-321). If the name is not unique, then the non-unique name error is flagged to the user, step 55 (C:315). If the partition name is unique, then information on the partition and its associated table is loaded into memory, step 56 (C:324-830).

Following either of step 55 or 56, the partition is marked as processed, step 57 (K:142) and process 40 loops back to step 45.

Figure 3:
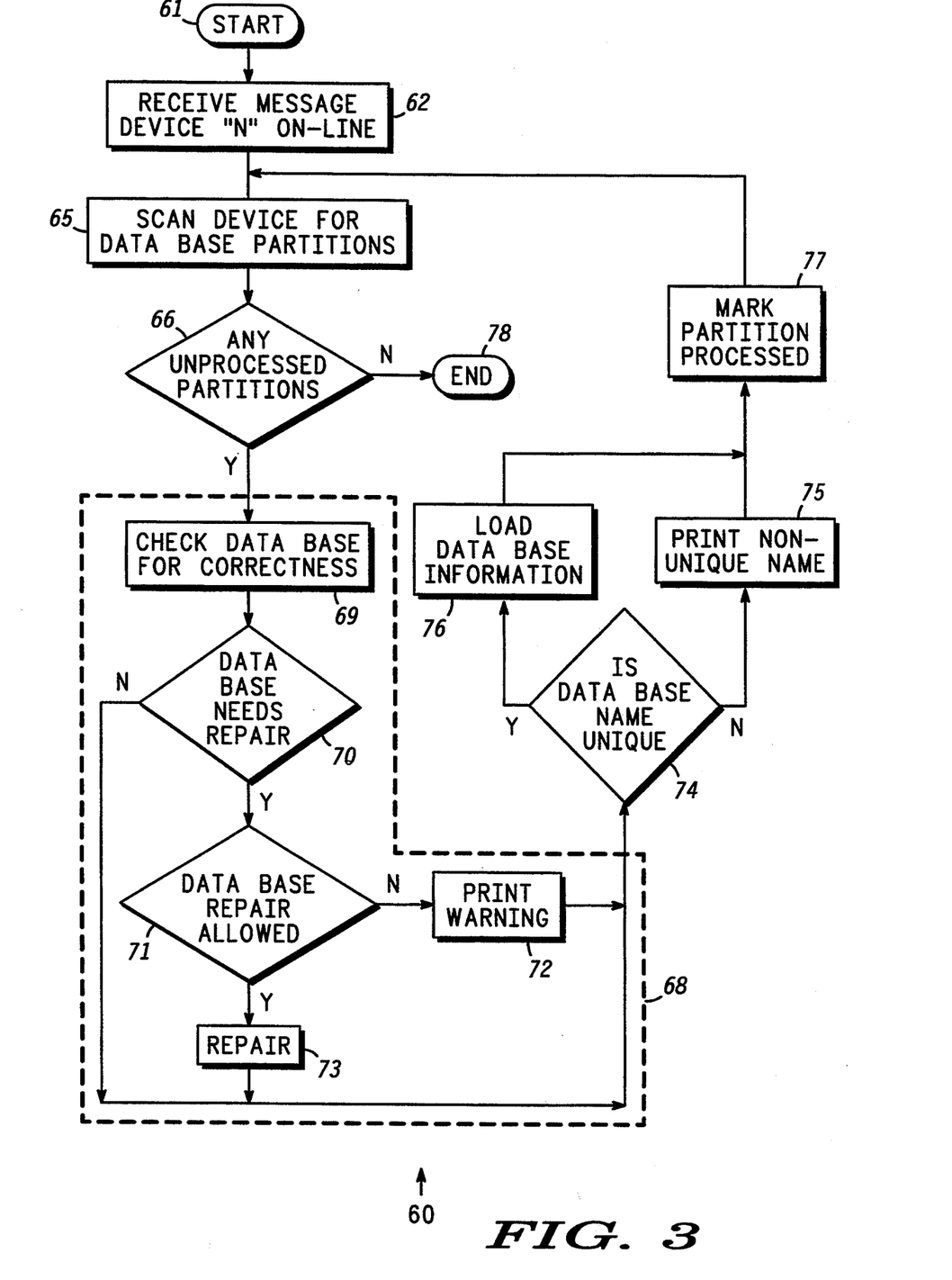
FIG. 3 shows a flow chart of a method, utilizing the present invention, for maintaining the name space during system run-time when an I/O device comes on-line.

In FIG. 3, a flow chart illustrating a process, utilizing the present invention and generally designated 60, of resolving names in a distributed data base system when a device comes on-line is shown. Process 60 closely resembles Process 40 of FIG. 2 with the exception of steps 62 and 78. Process 60 begins at step 61 and moves to step 62 (D:377-378) when a message is received from the operating system indicating that a device "N" has come on-line.

Process 60 then scans the device for any unprocessed data base partitions, step 66 (K:131-193). If there are no unprocessed partitions, decision step 66 (K:142), then process 60 ends, step 78. If there are unprocessed partitions, then process 60 executes steps 69-77 which parallel steps 49-57 of process 40.

Figure 4:
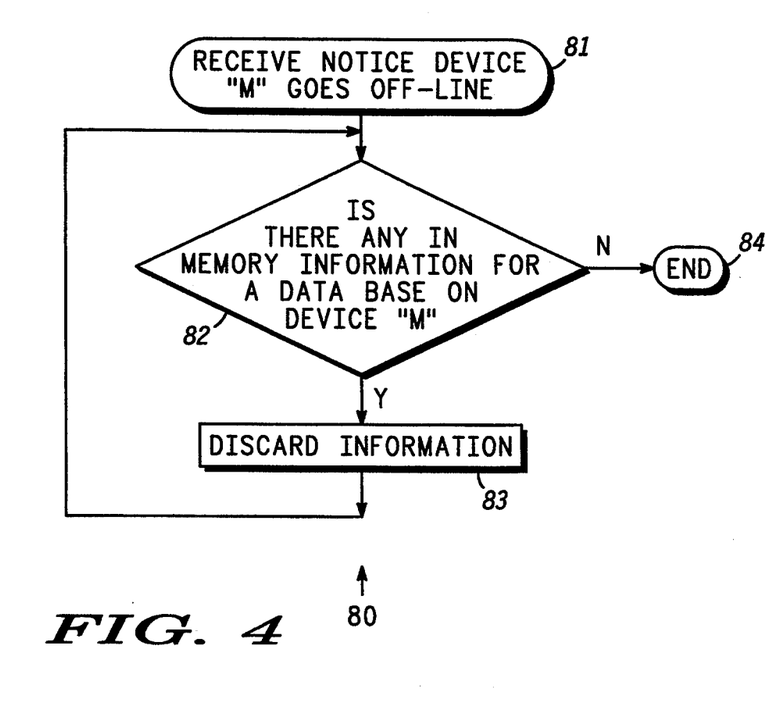
FIG. 4 shows a flow chart of a method, utilizing the present invention, for maintaining the name space when an input/output device goes off-line.

In FIG. 4, a flow chart illustrating a process, utilizing the present invention and generally designated 80, of cleaning up a memory in a distributed data base system during run-time when an I/O device goes off-line. Process 80 starts at step 81 (D:383) when a message is received that a device "M" is going off-line. Process 80 then decides if there is any information in memory for databases residing on device "M" (L:244-335). If information is found from such databases, it is discarded, step 83 (L:253-262). If there is no information found, process 80 ends, step 84.

Figure 5:
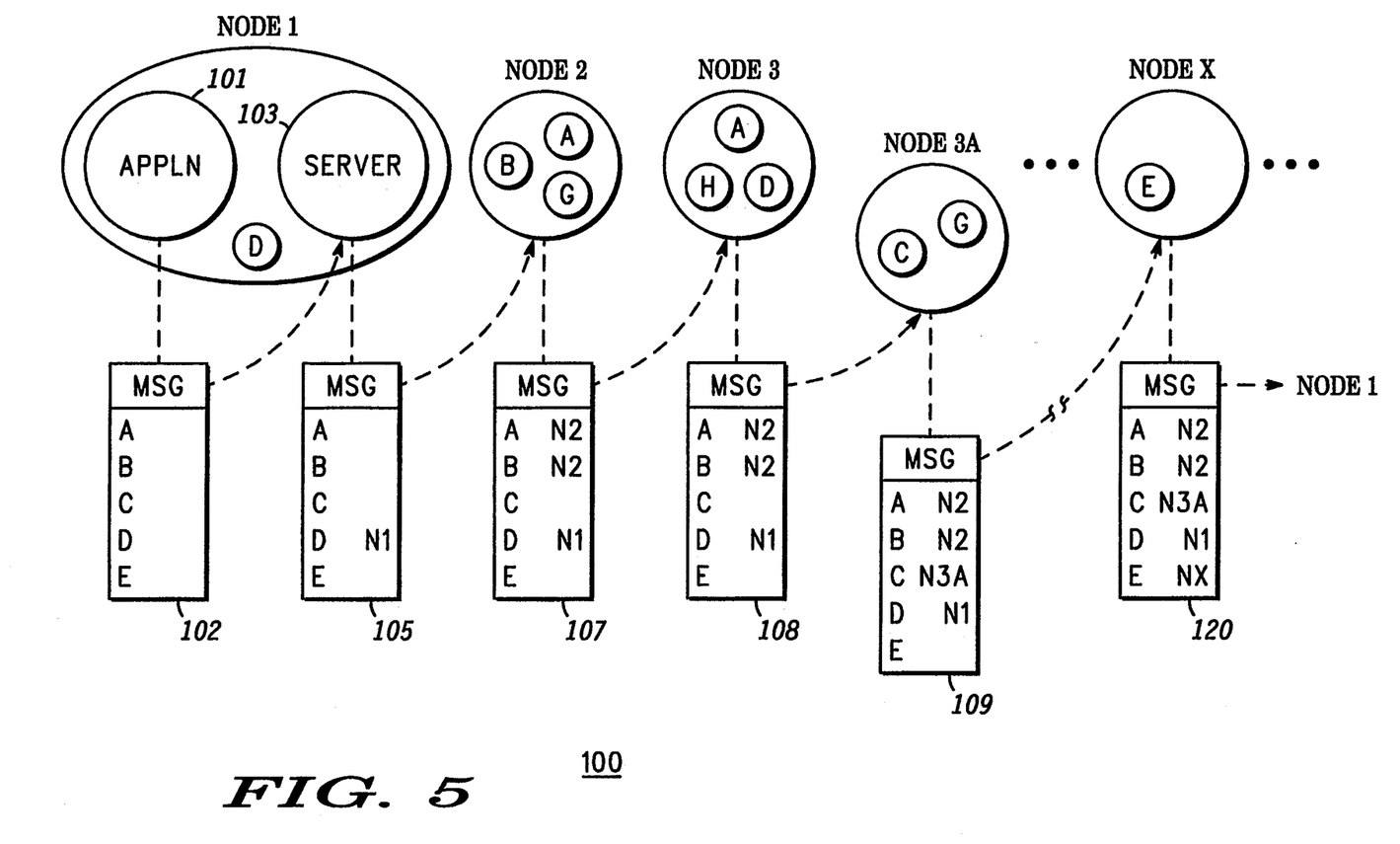
FIG. 5 shows a block diagram of a network utilizing a sequential method representing one embodiment of the present invention to fulfill a data base connection request.

Referring now to FIG. 5, a block diagram representing the process, generally designated 100, used to sequentially fulfill a connection request from an application 101 (which may also be referred to as a client) is illustrated. Application 101, located on Node 1 commences the process by sending a message 102 to its server 103 requesting, by name, connection to tables A, B, C, D, and E. Server 103 will then determine whether any of the named tables are present on Node 1. In the present example, table D is present on Node 1. Therefore, server 103 will generate a message indicating that a connection to data bases A, B, C, and E is being sought since the connection to table D has been made by Node 1.

If Node 1 had contained all of the tables being sought by application 101, the message generated by server 103 would have been returned to application 101 indicating that a connection had been implemented to all of the tables and that all of the tables resided on Node 1.

In our present example, there are still connection requests unfulfilled. Therefore, message 105 is forwarded to the next node, Node 2, which contains tables A, B, and G. The server for Node 2 will make a connection to tables A and B on behalf of application 101. The message will then be modified to show that the requests for tables A and B is being satisfied by Node 2, message 107.

Message 107 is then transmitted over the network to the next logical node, Node 3. Since Node 3 does not contain any of the remaining tables sought by application 101, none of the requests are fulfilled at Node 3.

During the processing of the connection request, it is possible for a new node to come on-line. If this new node comes on-line after message 105 is transmitted but before the message is routed past the logical position of its node ID, then the message will be sent to that new node. As an example, Node 3A came on line after message 105 was transmitted and before message 108 was to be transmitted. Therefore, message 108 is transmitted to Node 3A since it is the next logical node in the network. Since Node 3A contains table C, a connection will be made with table C and the message will be marked as Node 3A fulfilling the request for table C.

If, at this point, the message had been processed around the network and was returned to Node 1, the request for table E would still be unfulfilled. In this event, server 103 would notify application 102 that its request has partially failed.

The other alternative is that the message continues to be passed around the network until a Node X is reached which contains table E. The message is then updated and, since there are no unfulfilled requests in message 120, the rest of the network is bypassed and message 120 is directly returned to the application as a successful completion of its request.

Figure 6:
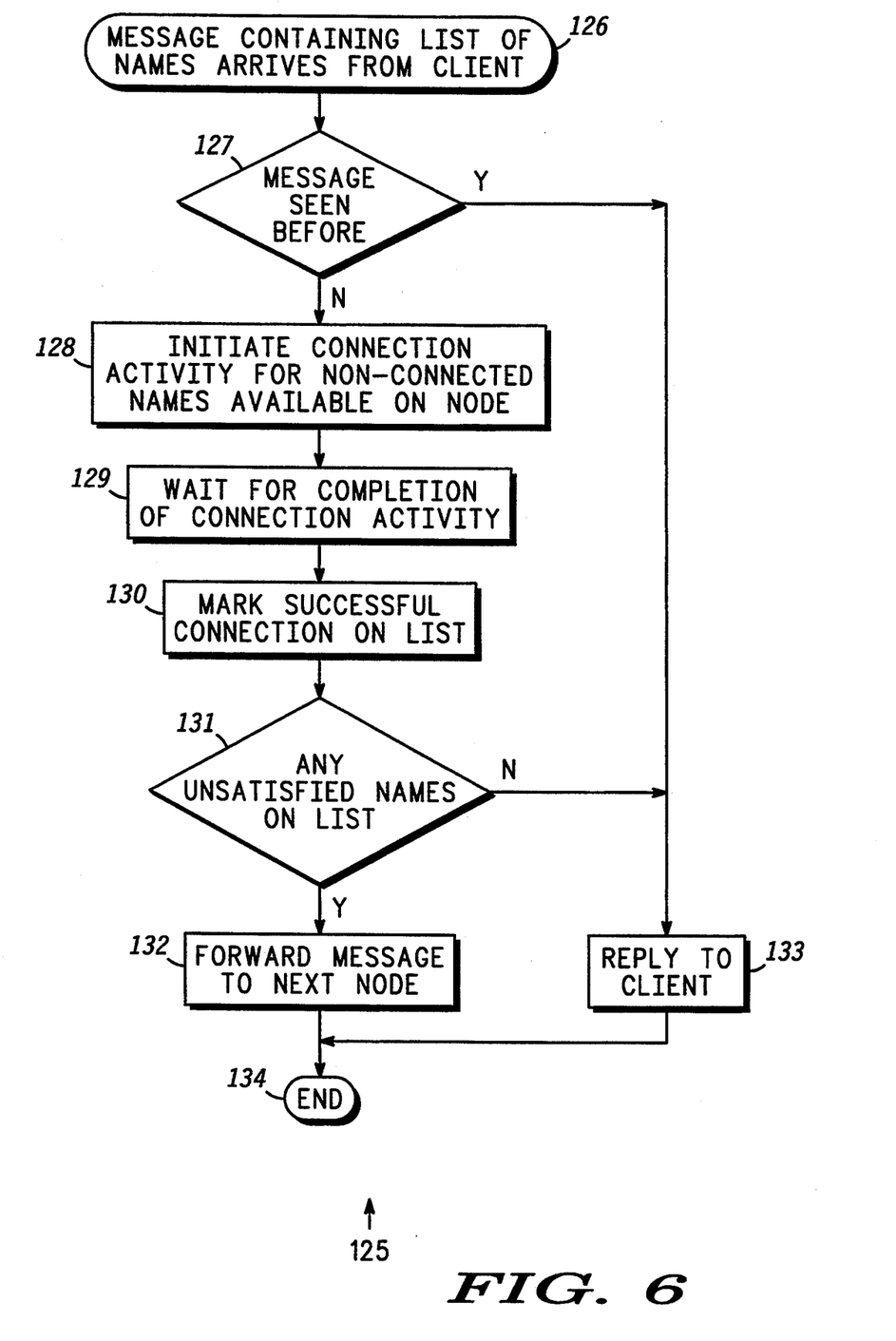
FIG. 6 shows a flow chart of the sequential method illustrated in FIG. 5.

A flow chart of a process, generally designated 125, of the action taken by a node upon receipt of a connection request message is set forth in FIG. 6. Process 125 commences when a message containing a list of table names is received from a client, or application, step 126 (D:275-277). Process 125 then determines if the message has been seen before, decision step 127 (E:1-76-177).

If the message has not been seen before, process 125 initiates connection activity for any non-connected names available on the node, step 128 (E:189-375). The process then waits for the completion of the connection activity, step 129 (D:245), and marks any successful connections on the list, step 130 (H:277).

Process 125 then determines if there are any unsatisfied names remaining on the list, step 131 (H:231-237). If there are no more names on the list, or if the message had been seen before, decision step 127, a reply is sent to the client, step 133 (H:332-334). Otherwise, if there is still one or more unsatisfied names on the list, the message is forwarded to the next node, step 132 (H:319-320). Following either steps 132 or 133, process 125 ends, step 134 (H:337-338).

In this way, the system has attempted to fulfill a request from an application by sequential routing the connection request to the nodes on the network. Another means of fulfilling a request from an application is by parallel processing the request. This is demonstrated by the block diagram of FIG. 7. In Node 1, an application 201 sends a message to a node server 203 requesting access to particular tables by name (A-E). Node 1 then polls the network to see what nodes are active and makes a list of these nodes, node list 204. Node 1 then generates a message 205 and broadcasts it in parallel to all of the nodes on the network, including itself.

Figure 7:
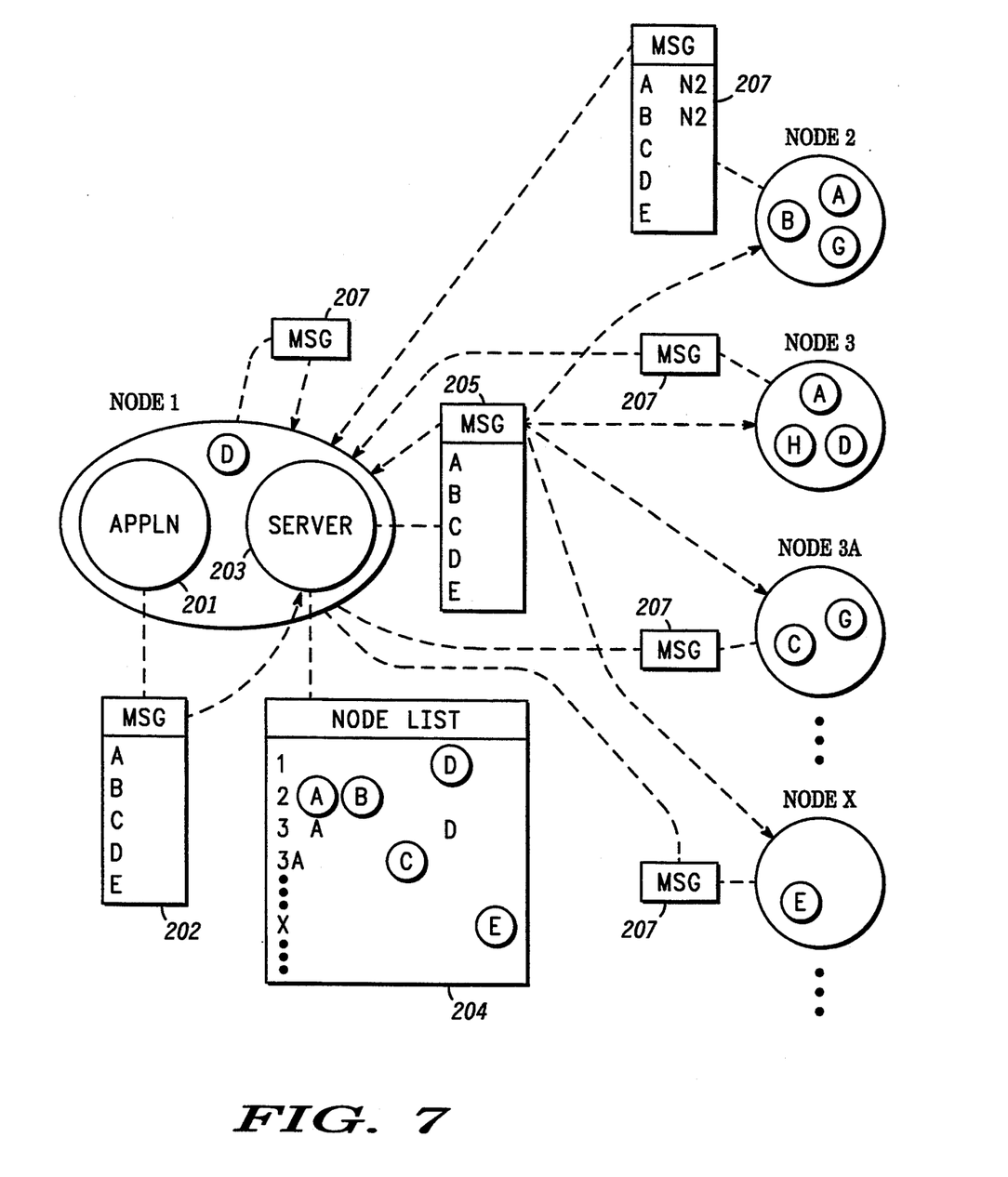
FIG. 7 shows a block diagram of a network utilizing a parallel method representing another embodiment of the present invention to fulfill a data base connection request.

Each node then determines if it contains any of the requested tables. If it does, a connection is made with the data base. A reply message 207 is then formulated by each node, including Node 1, to return to Node 1, listing the tables which were requested and available. For example, reply message 207 from Node 2 will show that tables A and B are available on Node 2.

Because of the timing of the messages, it is possible for a node, such as Node 3A, to come on-line after Node 1 has polled the network to create the node list and before the transmission of message 205. If this occurs, Node 3A will receive request 205 and formulate a reply. Node 1 will then receive a reply from a node not on node list 204. In this situation, Node 1 will update the node list to include the responding node.

In a related situation, a node may die (go off-line) after the network is polled but before the dead node could reply to message 205. Whenever a node dies, a notice is sent throughout the network. Therefore, upon receipt of this node death message, Node 1 will update the node list by removing the dead node. This will prevent the situation where Node 1 is awaiting a reply from a node which will not be submitting a reply.

As replies 207 are received, Node 1 updates its node list to show all of the data bases available to application 201. Once replies have been received from all of the nodes on node list 204, Node 1 examines list 204 to select the particular tables to be used.

If the tables available on the network are unable to fulfill the entire request, application 201 is notified that its request has partially failed. If all of the tables requested are available, then the server at node 1 arbitrates between duplicate names and then application 201 is notified and provided a list of which node each table is located. The rejected duplicate tables, such as A and D on Node 3, are then sent a disconnect message so that they may be released for other purposes.

Figure 8:
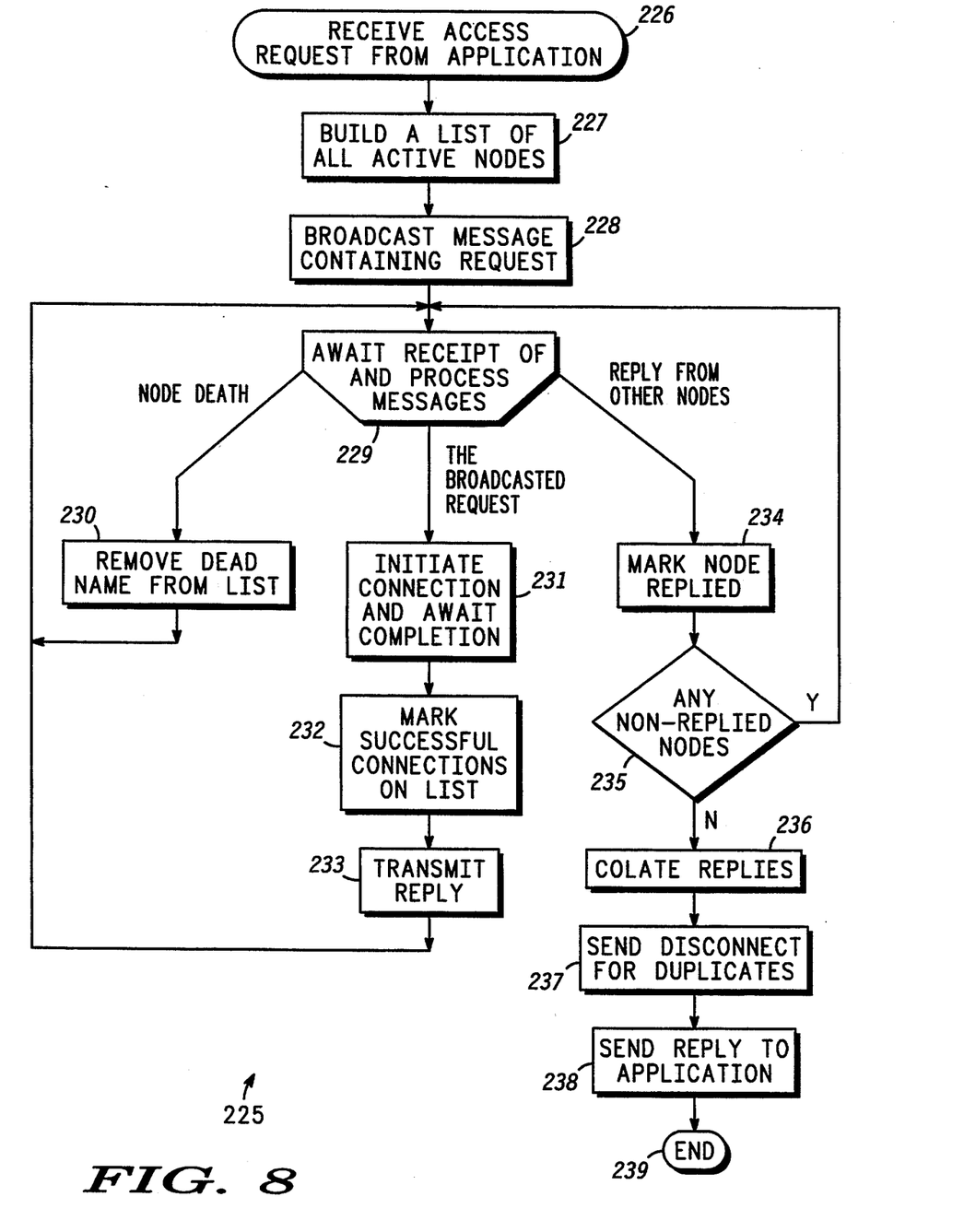
FIG. 8 shows a flow chart of an originating node process of the parallel method illustrated in FIG. 7.
Figure 9:
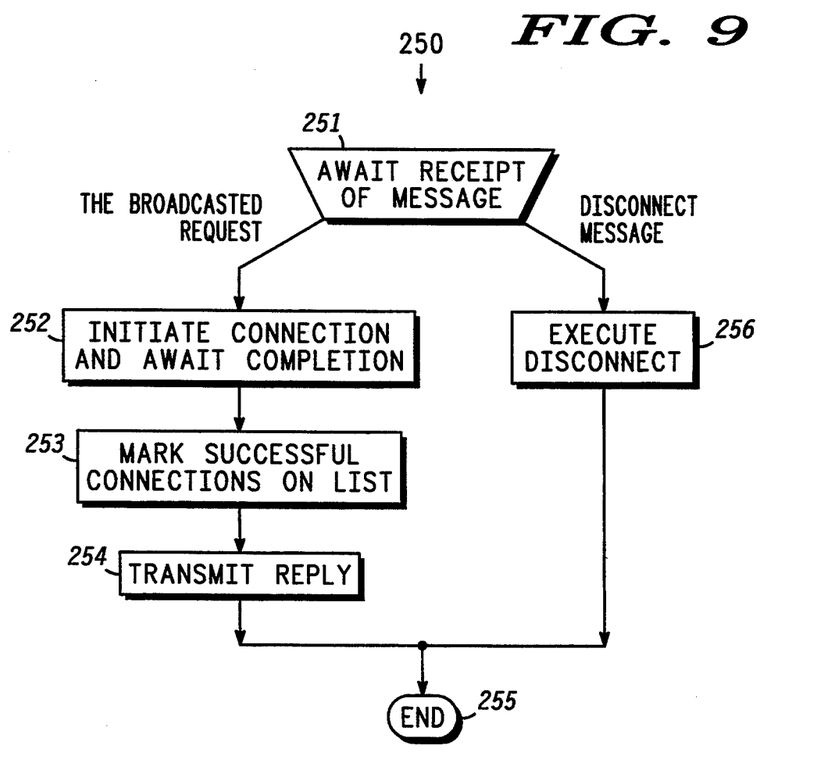
FIG. 9 shows a flow chart of a non-originating node process of the parallel method illustrated in FIG. 7.

Flow charts of the processes used to complete the above parallel routing scheme are provided in FIGS. 8 (originating node) and 9 (non-originating node). Referring first to FIG. 8, a process, generally designated 225, executed by the originating node is illustrated. Process 225 commences with the receipt of a message from a client requesting access to a list of tables, step 226 (D:275-277). The network is then polled by the originator node to build a list of active nodes, step 227 (I:1-17-187). Once the node list is built, a message containing the request is broadcast throughout the network, step 228 (F:163-166).

Process 225 then awaits the receipt of a message, step 229 (D:245). If a node death message is received, the node is removed from the node list, step 230 (I:7-42-763), and process 225 loops back to step 229.

If the broadcast message is received, the originator node takes the same steps as a non-originator node. The connection is initiated and a completion reply is awaited, step 231 (F:190-336). The successful connections are marked, step 232 (G:252), and a reply is transmitted, step 233 (F:343-345). Process 225 then loops back to step 229.

If a reply is received, the node is marked as replied on the node list, step 234 (I:711-712). Process 225 then determines if there are any nodes which have not replied, decision step 235 (I:510-522). If there are nodes remaining which have not replied, process 225 loops back to step 229. If all of the nodes have replied, the replies are collated, step 236 (I:305-439), and, in the case of duplicates, only one table is selected by the collating mechanism. A disconnect message is then sent to any duplicate data bases not selected, step 237 (I:4-61-479), and a reply is sent to the application, step 238 (I:445-446). The reply either informs the application that the request has failed (completely) or that the request was at least partially successful and informs the application of the location of the tables. Process 225 then ends, step 239 (I:480-485).

Referring now to FIG. 9, a block diagram of the process, generally designated 250, executed by a non-originating nodes is illustrated. Process 250 commences by awaiting the receipt of a message, step 251 (D:245). If the received message is a broadcast message from the originating node, then connections are made, step 252 (F:190-336); the reply list is marked, step 253 (G:252); and a reply is transmitted, step 254 (F:343-345). These are the same steps as performed by the originating node when it receives a broadcast request. Process 250 then ends, step 255.

If the message received was a disconnect request, then the disconnect is executed, step 256 (D:283-284), and process 250 ends, step 255.

In the above description, methods that enable non-replicative name servers for data bases to dynamically build and maintain the name space and provide fast (parallel) name resolution have been provided. In addition, parallel processing techniques have been described which provide faster methods of fulfilling data base requests than the sequential processing.

Thus, it will be apparent to one skilled in the art that there has been provided in accordance with the invention, a process and method that fully satisfy the objects, aims, and advantages of this invention.

While the invention has been described in conjunction with specific embodiments thereof, it is evident that many alterations, modifications, and variations will be apparent to those skilled in the art in light of the foregoing description.

What is claimed is:

1. In a distributed data base management system, a method for performing name resolution during a start-up operation of said system, said method comprising the steps of:
    (a) scanning an input/output bus for an unprocessed input/output device, the unprocessed input/output device being defined as an input/output device with respect to which steps (c) through (f) have not yet been performed;
    (b) exiting said method if said unprocessed input/output device is not found;
    (c) scanning said unprocessed input/output device for an unprocessed data base partition of a data base, the unprocessed data base partition being defined as a data base partition with respect to which steps (d) through (f) have not yet been performed, said data base partition having an information regarding said data base, the information of said data base identifying one or more data sets within the data base;
    (d) marking said unprocessed input/output device as processed if said unprocessed data base partition is not found in step (c);
    (e) outputting a name of said data base partition and returning to step (c) if a name of said data base is not unique; and
    (f) loading said information of said data base into a memory and returning to step (c) if said name of said data base is unique.

2. The method of claim 1 wherein said information regarding said data base is a name of said data base.

3. The method of claim 1, further comprising the steps of:

scanning the memory of said system for said information of said data base residing on a processed input/output device during a run time operation of said system when the input/output device is taken offline; and discarding said information from said memory.

4. In a distributed data base management system, a method for performing name resolution during a runtime operation of said system, said method comprising the steps of:

(a) receiving a message that an input/output device is on-line;

(b) scanning said input/output device for an unprocessed data base partition of a data base, the unprocessed data base partition being defined as a database partition with respect to which steps (d) through (f) have not yet been performed, said data base partition having an information regarding said data base, the information of said data base identifying one or more data sets within the data base;

(c) exiting said method if said unprocessed data base partition is not found in said input/output device;

(d) marking said unprocessed input/output device as processed if said unprocessed data base partition is not found in step (b);

(e) outputting a name of said data base partition and returning to step (b) if a name of said data base is not unique; and (f) loading said information of said data base into a memory and returning to step (b) if said name of said data base is unique.

5. The method of claim 4 wherein said information regarding said data base is a name of said data base.

6. In a distributed data base management system, a method for fulfilling a data base connection request issued by a client comprising the steps of:

receiving a connection request method at a first node, said connection request message requesting connection to a plurality of table names;

connecting a table, located on said first node and having a first table name of said plurality of table names, to said client if said connection request message was not previously received by said first node and said first table exists on said first node;

marking said first table name on said connection request message as being connected following said step of connecting;

forwarding said connection request message to a second node if a second table name of said plurality of table names is not marked as being connected and repeating said method with the second node becoming the first node;

sending a completion reply to said client if said plurality of table names are all marked as being connected; and sending a failure reply to said client if said connection request message was previously received by said first node.

7. In a distributed data base management system, a method for fulfilling a connection request message issued by a client comprising the steps of:

(a) receiving said connection request message at a first node, said connection request message requesting connection to a table having a table name;

(b) building a list of a plurality of nodes on a network coupled to said first node;

(c) broadcasting said connection request message from said first node to said plurality of nodes on said network;

(d) receiving a reply from one of said nodes of said plurality of nodes;

(e) indicating on said list of said plurality of nodes that said reply was received from said node and connecting the table having the table name to said client;

(f) repeating steps d and e until a reply has been received from each of said plurality of nodes on said list of said plurality of nodes;

(g) collating said replies from said plurality of nodes following step f;

(h) sending a reply to said client and disconnecting the table having the table name if the table name is a duplicate of the table name of a previously connected table.

8. The method of claim 7 further comprising the steps of:

selecting a first reply node of said plurality of nodes having said table; and sending a disconnect message from said first node to a second reply node of said plurality of nodes having said table.

9. The method of claim 7 further comprising the steps of:

receiving, at each of said plurality of nodes, said broadcast connection request message from said first node;

connecting a table having said table name requested by said client and located on a second node of said plurality of nodes; and transmitting said reply from said second node to said first node.

10. The method of claim 7 further comprising the steps of:

receiving a node death message for a node disengaged from said network following said building step; and removing a name of said disengaged node from said list of said plurality of nodes.

11. In a distributed data base management system, a method for fulfilling a connection request message issued by a client comprising the steps of:

receiving a connection request message broadcast from a first node of a network to a second node of said network, said first node having said client and said connection request message having a table name to which connection is requested;

making a connection to a table on said second node if a name of said table is said table name of said connection request message;

marking said table name of said connection request message as being connected if said connection was made;

returning said connection request message to said first node from said second node; and disconnecting the connected table if the table name is a duplicate of the table name of a previously connected table.

12. The method of claim 11 wherein the disconnecting step comprises the steps of:

receiving at said second node from said first node, a disconnect message for said table having said table name of said connection request message; and disconnecting said table.

* * * * *